(No Model.)  
4 Sheets—Sheet 3.

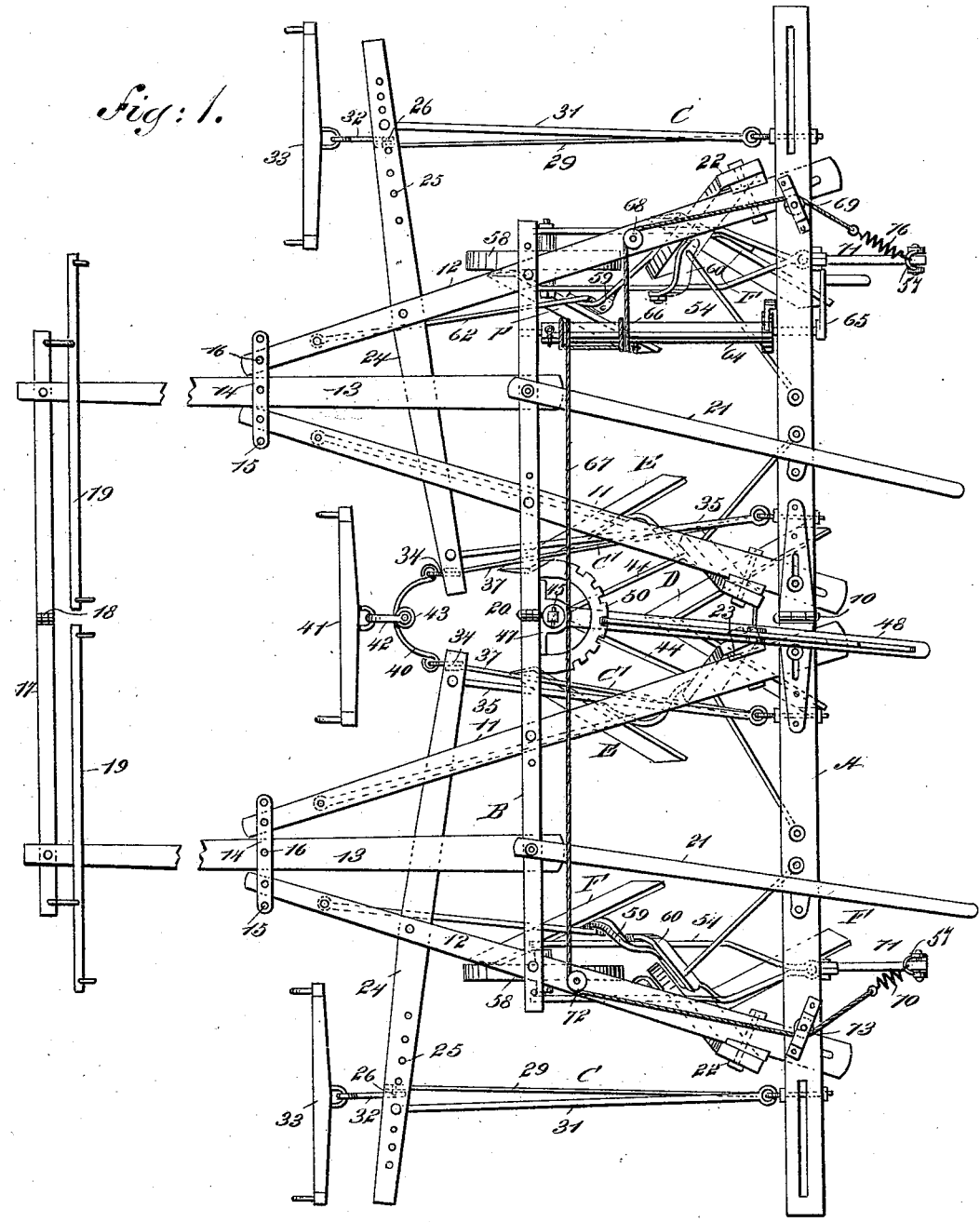

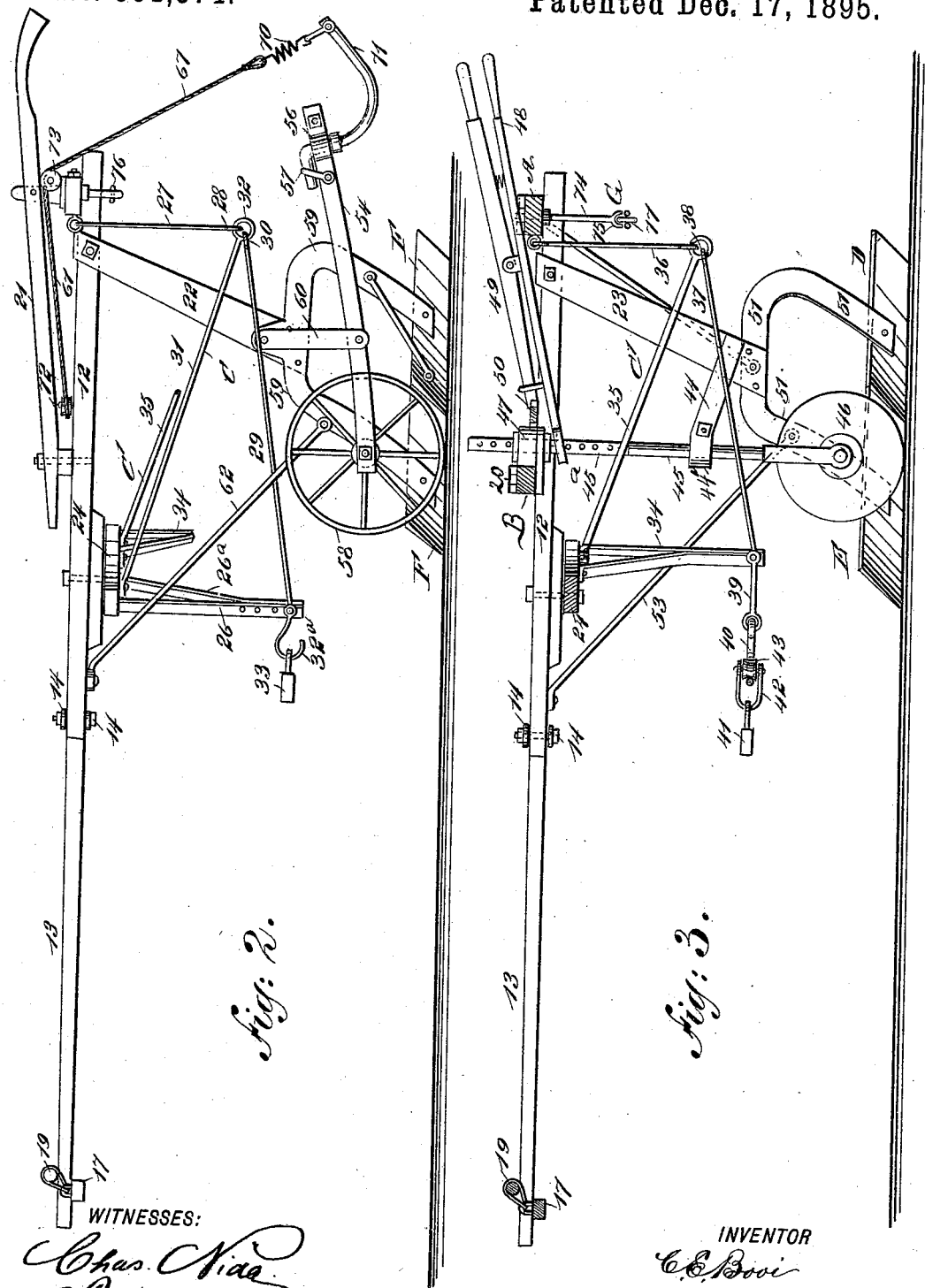

C. E. BOOI.
CULTIVATOR.

No. 551,574.  
Patented Dec. 17, 1895.

WITNESSES:  
Chas Niew  
Fred Acker

INVENTOR  
C. E. Booi  
BY  
Munn & Co  
ATTORNEYS.

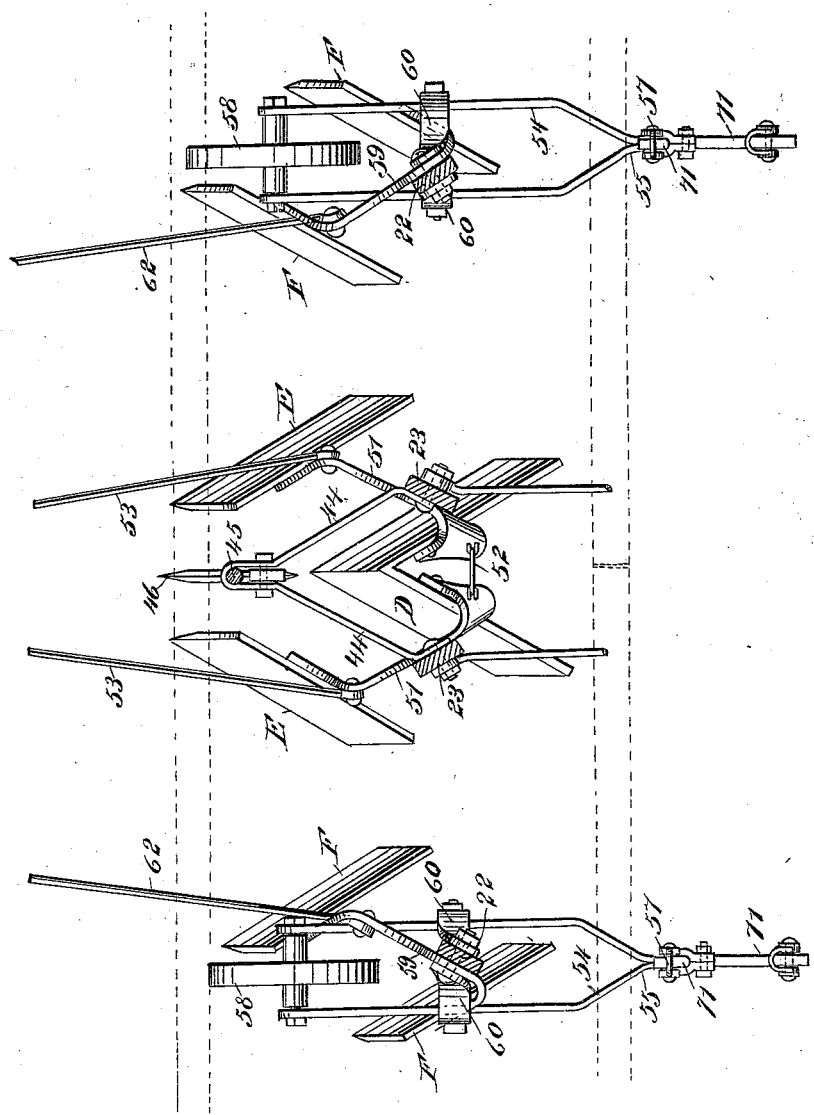

UNITED STATES PATENT OFFICE.

CHARLES E. BOOI, OF DANFORTH, ILLINOIS.

CULTIVATOR.

SPECIFICATION forming part of Letters Patent No. 551,574, dated December 17, 1895.

Application filed July 15, 1895. Serial No. 556,027. (No model.)

*To all whom it may concern:*

Be it known that I, CHARLES E. BOOI, of Danforth, in the county of Iroquois and State of Illinois, have invented a new and Improved Cultivator, of which the following is a full, clear, and exact description.

My invention relates to an improvement in cultivators; and it has for its object to provide a cultivator capable of being drawn by three horses, the frame of the cultivator being provided with equalizing devices whereby the strain on the team will be reduced to a minimum, the draft being taken from the rear portion of the machine.

Another object of the invention is to provide a means whereby the side draft will not be sustained by the team, or the harness made to chafe the animals or otherwise injure them.

Another object of the invention is to provide a means whereby all of the cultivator-blades may be expeditiously and conveniently raised from the ground, and the machine be made to travel upon supporting-wheels, one at each side.

Another object of the invention is to construct a gopher-cultivator which will be economic, durable and simple, and thoroughly under the control of the operator.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 4:
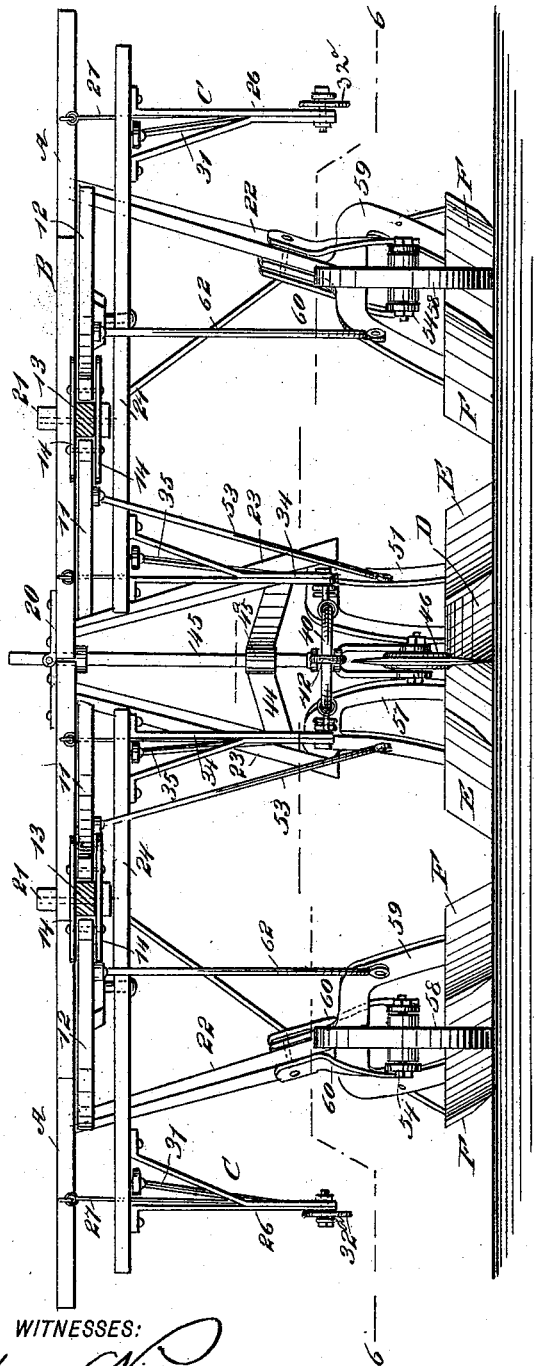
Figure 5:
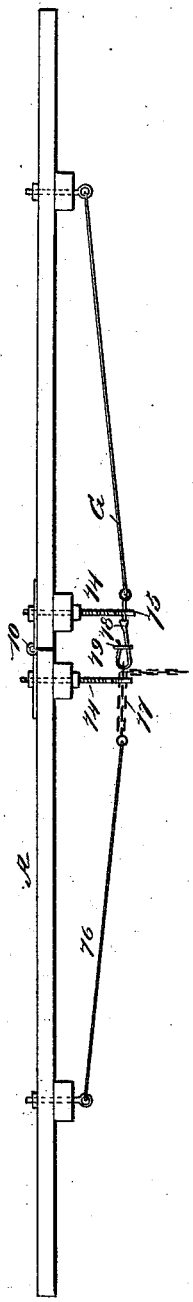

Figure 1 is a plan view of the improved cultivator. Fig. 2 is a side elevation of the same. Fig. 3 is a central longitudinal section through the cultivator. Fig. 4 is a front elevation of the body of the cultivator, the poles or tongues being in transverse section. Fig. 5 is a rear view of the rear beam of the frame and its truss-support, and Fig. 6 is a horizontal section taken substantially on the line 6 6 of Fig. 4.

In carrying out the invention what may be termed the "frame" of the cultivator consists of a rear beam A, connected at its center by means of a hinge 10, thus dividing this beam into two sections. Each section of the rear beam A has adjustably attached thereto the rear ends of beams 11 and 12, the said beams being carried in a forward direction, and they are arranged substantially in the shape of a letter A, the forward ends of the beams being made to converge; and between the converging ends of each set of inclined beams a tongue or pole 13 is introduced, and the tongue or pole is connected with the beams in an adjustable manner by means, for example, of straps 14, placed at the top and at the bottom and provided with a series of openings 15, through sundry of which bolts 16 are passed, connecting the two straps and extending through the beams and the tongue, as is best shown in Fig. 1. These frame-beams 11 and 12 are made thus adjustable in order that they may be widened at their forward ends when desired without interfering with the cultivator-blades, which are supported from these beams at the rear.

The forward ends of the tongues or poles 13 are connected by a front bar 17, which is made in two sections, the sections being connected by a hinge 18, the hinge 18 being in alignment with the hinge 10 of the rear beam A. The front bar 17 extends beyond the outer sides of the poles or tongues, and each section has connected to its outer end a neck pole or yoke 19, these poles or yokes being carried inward to the space between the tongues 13, and they are therefore attached to the front bar 17 considerably at one side of their centers, as is likewise shown in Fig. 1. The frame may be said to be completed by the addition of an intermediate cross-bar B, which is parallel with the rear beam A and is made in two sections, the sections being connected by a hinge 20, and this cross-bar is attached in any approved manner to the diagonal or inclined beams 11 and 12 and the rear ends of the tongues 13.

Handles 21 are attached at their forward ends upon the sections of the intermediate bar B, and these handles extend rearward and are adjustably connected with the rear beam A, or may be held to slide on said beams. These handles may be utilized as supports for the operator, and at the same time are useful in guiding the machine.

A side beam 22 is projected downwardly and forwardly from the outer face of each outer diagonal frame-beam 12, being attached to the diagonal beams near their rear ends, and beams 23, having preferably a downwardly and forwardly diagonal direction, are secured to the inner edges of the inner diagonal frame-beams 11 near their rear ends, as shown in Figs. 1 and 3. These beams 22 and 23 may be designated "standards," since they are adapted to carry shares or cultivator-blades.

An equalizer 24 is fulcrumed upon each outer diagonal frame-beam 12 and the outer end of each equalizer is provided with a series of apertures 25. A draft-bar 26 is projected vertically downward from the apertured portion of each equalizer, being provided with braces $26^a$, as shown in Fig. 2. The draft-bar 26, together with the equalizer, are connected with the frame through the medium of a series of connected links C. These links are three in number, as best shown in Fig. 2, comprising a vertical link 27, which is pivotally connected with and extends downward from the rear beam A, terminating in an eye 28, a lower and horizontal link 29 which terminates at its rear end in the eye 30 and at its forward end is adjustably connected with the lower portion of the draft-bar 26, and a third link, which is between the two links 27 and 29, is provided at its rear end with an eye 32, the eyes of the three links being connected, and the forward end of the link 31 is attached by a bolt or otherwise to the equalizer at its apertured end, the bolt passing through one of the apertures, and by shifting this link 31 the equalizer may be adjusted to suit the animal forming one of the team.

A hook $32^a$ is adjustably connected with each draft-bar 26 at the same point as the forward end of the link 29 of the equalizing device, as is also shown in Fig. 2; and the singletree 33 is attached to the draft-bar through the medium of the said hook; but any equivalent of the hook may be employed.

At the inner end of each equalizer 24 another draft-bar 34 is attached, and this draft-bar, together with the inner end of each equalizer, is controlled by a set of equalizing-links C', corresponding in every way to the series of links C at the outer end of the equalizer; and the inner series of equalizing-links comprises a vertical link 36, as shown in Fig. 3, which is attached to the rear beam A of the frame, a lower substantially horizontal link 37, connected with the draft-bar 34, and a diagonal link 35, connected with the equalizer and serving to connect the links 36 and 37 through the medium of eyes 38.

A link 39 is made to extend forwardly over each of the inner draft-bars 34, and these links are connected by a yoke 40. A central singletree 41 is employed, provided with a clevis 42, having a friction-roller 43, and the yoke 40 passes through this clevis, engaging with the said friction-roller 43, as shown in Figs. 1 and 3. Thus it will be observed that the draft is from the rear of the frame at each side of its center and at each outer end.

A vertical shaft 45, carrying at its lower end a colter 46, is located at the central portion of the frame, having vertical movement in a collar or sleeve 47, located upon the intermediate or cross beam B at or near its hinge 20, as shown in Figs. 1 and 3. This shaft is provided with a number of apertures $45^a$, through which pins may be passed one above and the other below the socket 47, the colter being adjustable vertically, so as to engage to a greater or less degree with the ground by means of a hand-lever 47, pivoted upon the rear portion of the frame, and having a fork at its forward end, which engages with one of the pins in an aperture $45^a$. By means of this colter the machine is guided, and therefore the colter must be turned to the right or to the left. This is accomplished by moving a hand-lever 48 in either of the aforesaid directions, and this hand-lever carries a latch 49, adapted to engage with a rack 50 secured upon the frame. This rolling-cutter not only guides but cuts clods and weeds and prevents clogging.

It is necessary that the shaft 45 should have a bearing near its lower end. Therefore a yoke-support 44 connects the two central standards 23 and projects forwardly therefrom, the yoke-support having an eye $44^a$ at its forward end, through which the shaft passes.

When the animals have been attached to the singletrees, the outer animals are connected with the outer ends of the yokes 19, while the inner ends of both these yokes are connected with the harness of the animal attached to the central singletree. Immediately back of the colter 46 a triangular cultivator-blade D is secured to the standards 23, as shown in Fig. 6, the attachment being made through the medium of two arms 51, which arms are curved inward after leaving the standards to meet the inner faces of the side sections of the blade, and the two arms are connected preferably by means of a tie-rod 52. The forward end of each arm 51 is curved in an inwardly direction, or in direction of the colter, and the arms upon leaving the standards in a forwardly direction are given an inclination in direction of the ends of the frame, and upon the forward curved portion of each arm 51 a substantially straight or single-membered cultivator-blade E is secured. These single or side cultivator-blades E converge therefore at their forward ends and diverge at their rear ends, the converging ends being located one at each side of the colter. The arms 51 are braced by means of bars 53, which are carried upward to a connection with the intermediate beam B, for example, or to any other convenient support.

At each end portion of the frame and beneath said frame a horizontal yoke-frame 54 is located, the said frame being provided at its rear end with a shank 55, having an eye 56 therein, and a clevis 57 adjacent to the eye. In the forward end of each of these yoke-frames a ground-wheel 58 is journaled, and these wheels are located one practically in front of each of the side standards 22, as shown in Figs. 2 and 6. A substantially U-shaped arm 59 is secured to each of the end standards 22, as particularly shown in Fig. 6, the bow portion being secured to the standard, while the end members extend forward at an angle to the standard, and the yoke 54 is attached to the standard to which it belongs by means of upwardly-extending arms 60.

A comparatively straight cultivator-blade F is secured to each end member of each U-arm 59. Therefore one of these blades will be located in advance of each end standard and the other at the rear. The blades are parallel, and are at an angle to the standards, and the rear ends of the forward blades F converge toward the corresponding ends of the opposing straight blades E of the center set of cultivators, as shown in Fig. 6. The U-arms 59 are connected with a suitable portion of the frame by means of braces 62.

The frame 54 is adapted to be brought into action to raise the rear end of the frame of the machine by forcing the ground-wheels to an engagement with the ground, and at the same time lifting upward on the end standards, which is accomplished by raising the rear ends of the said frames 54, the frames being connected with the standards by means of the arms 60, as heretofore stated, and as shown particularly in Fig. 2.

The lifting or elevating frames 54 are raised simultaneously, and this is accomplished by journaling a drum 64 in, for example, the rear beams A and intermediate beam B of the cultivator-frame, as shown in Fig. 1. This drum is provided at one end with a crank 65, by means of which it is revolved, and two ropes, cables or chains 66 and 67 are attached to the roller, being wound thereon in opposite directions. The cable 66 is carried to the right of the frame over a friction-roller 68 located upon the frame-beam 12. The cable is then carried rearward over a second friction-roller 69, located upon the rear beam A, and is then carried downward and rearward and secured at its rear extremity to a spring 70. This spring in its turn is connected with an upwardly-curved spindle or slipper 71, which is practically swiveled, and one end of this slipper is carried up through the eye 56 in the right-hand lifting-frame 54, and is bent over upon said frame and engaged by the clevis 57, which practically makes the spindle 71 rigid with the frame.

The cable 67 is carried over two friction-rollers 72 and 73, located at the left-hand side of the frame, and is made to engage in like manner as the right-hand cable with the spindle 71 of the left-hand lifting-frame. Thus it will be observed that by turning the drum 64 the rear ends of the lifting-frames will be raised, forcing the ground-wheels to a firm engagement with the ground. At the same time the lifting-frames 54 will have an elevating action on the main frame of the machine, raising its rear end, and therefore taking all of the cultivator-blades from engagement with the ground. The machine may now be driven from the field, traveling upon its ground-wheels, and the clevis 57 may be removed from engagement with the spindle 71, permitting the latter to turn in the elevating-frames.

In order that the rear beam A of the frame may be held stiff, although made in hinged sections, I employ a truss G, (shown in Fig. 5,) which consists of bolts 74, which are passed downward through the rear beam at each side of the hinge, each of said bolts being provided with a fork 75 at the bottom thereof, and near each end of each section of the said beam one extremity of a rod 76 is pivotally connected with the under face of the section and the inner end of one of the said rods is provided with a chain 77, while the inner end of the other rod is provided with a hook 78 having a keeper 79. The chain is made to pass through the fork of one of the bolts 74, the hook passing through the fork of the opposite bolt, and tension is brought to bear in a downward direction upon the beam A by causing a proper link of the chain 77 to be held by the hook 78.

It is evident that the working parts of the cultivator are locked whenever raised or lowered. When the rows are not planted in "check perfect," or when the field is very muddy, the frames or arms 54 carrying the wheels 58 may be reversed, bringing the slippers 71 in the position of the wheels 58 and the wheels at the rear. In this event the clevis 57 is taken off until the slipper is carried to the opposite side of the socket 56 in which the slipper has movement, the position being opposite that shown in the drawings and especially in Fig. 2, and in this event the slipper will have but a half-swivel. When no clevis is used the slipper will have a full swivel, and when the clevis is placed over the top part of the slipper the latter will be stationary. It will be observed that the cables controlling these arms or frames will be correspondingly changed. In carrying out this alteration the changes are made in the following manner: When the frames or arms 54 are reversed I simply attach the spring 70 or the clevis on the wheel-tire or one of the spokes. In order to use the slipper or wheel in the rear I remove the friction-roller 69, place it on the cross-bar B, where the holes can plainly be seen, and remove the cable to the opposite side of the roller 68. At the left-hand side of the machine the roller 73 is removed upon the cross-bar A, where the holes can be plainly seen above the wheels, and the rope on the roller 72 must be placed on the opposite side.

Having thus described my invention, I claim as new and desire to secure by Letters Patent—

1. In a cultivator, a frame, standards carried by the frame, cultivator blades attached to the standards, wheel supported frames connected with the standards and adapted to exert tension thereon in an upwardly direction, and a lifting apparatus connected with the rear ends of the said wheel supported frame, arranged to exert upward tension on said ends, as and for the purpose set forth.

2. In a cultivator, the combination, with a main frame, standards projected therefrom, and cultivator blades carried by the said standards, of lifting frames having wheels secured at their forward ends and provided with arms connecting them with the standards, a windlass, and a cable connection between the windlass and the rear ends of the said lifting frames, as and for the purpose set forth.

3. In a cultivator, the combination, with a frame, standards projected therefrom, and cultivator blades carried by the said standards, of arms provided with wheels at their forward ends, located adjacent to each outer standard of the frame, a connection, substantially as described, between said arms at the rear of the wheels and the said outer standards, a spindle having swivel connection with the free end of each arm, a locking device carried by the arm and adapted for engagement with the spindle, an elevating mechanism, and a connection between the spindle and the said elevating mechanism, as and for the purpose specified.

4. In a cultivator, the combination, with a frame, standards projected from the sides thereof, and cultivator blades arranged at an angle to the path of the cultivator and attached one in advance of the other to the end standards, of a substantially triangular blade supported by the central standards of the machine, an adjustable colter located in front of the apex of the said triangular blade, and single-membered cultivator blades located one at each side of the colter parallel with the sides of the triangular blade, as and for the purpose specified.

5. In a cultivator, the combination, with a frame, standards projected from the sides thereof, and cultivator blades arranged at an angle to the path of the cultivator and attached one in advance of the other to the end standards, of a substantially triangular blade supported by the central standards of the machine, a colter located in front of the apex of the said blade, said colter having rotary and adjustable vertical movement in bearings carried by the frame, and a shifting lever connected with the said colter, whereby it may be rotated, or elevated, or depressed, as and for the purpose set forth.

6. In a cultivator, a frame constructed in sections, said sections having a hinged connection, of a truss located beneath one of the divided members of the frame, the said truss consisting of rods attached to the under side of the said member at each side of its hinge, guide bolts located one at each side of the said hinge and extending downward from the said member, a chain connected with one of the rods and passed to an engagement with one of the bolts, and a keeper attached to the opposite rod, having guided connection with the bolt and locking engagement with a link of the said chain, substantially as described.

7. In a cultivator, the combination, with a frame, tongues projected forwardly from the frame, connected at their forward ends by a cross bar, and yokes connected with one outer end of the said cross bar, the attachment being made between the center and outer end of the yoke, of an equalizer pivoted one at each side of the frame, draft bars carried by the equalizer, singletrees connected with the draft bars, and equalizing links pivotally connected with each other, said links being attached one to the frame, another to the draft bar of the equalizer, and another having adjustable connection with the equalizer, as and for the purpose set forth.

CHARLES E. BOOI.

Witnesses:
A. J. DE LONG,
W. W. GILBERT.